(12) United States Patent
Juritsch et al.

(10) Patent No.: US 11,643,284 B2
(45) Date of Patent: May 9, 2023

(54) METHOD AND APPARATUS FOR PART TRANSFER AND TRANSPORT IN AN ASSEMBLY LINE

(71) Applicant: ATS AUTOMATION TOOLING SYSTEMS INC., Cambridge (CA)

(72) Inventors: Martin John Juritsch, Cambridge (CA); Ryan Chubb, Cambridge (CA)

(73) Assignee: ATS AUTOMATION TOOLING SYSTEMS INC., Cambridge (CA)

(*) Notice: Subject to any disclaimer, the term of this patent is extended or adjusted under 35 U.S.C. 154(b) by 299 days.

(21) Appl. No.: 16/804,364

(22) Filed: Feb. 28, 2020

(65) Prior Publication Data

US 2020/0198901 A1 Jun. 25, 2020

Related U.S. Application Data

(63) Continuation of application No. PCT/CA2018/051043, filed on Aug. 29, 2018.
(Continued)

(51) Int. Cl.
*B65G 47/69* (2006.01)
*B65G 47/91* (2006.01)
*B25J 15/00* (2006.01)

(52) U.S. Cl.
CPC ......... *B65G 47/69* (2013.01); *B65G 47/914* (2013.01); *B25J 15/0052* (2013.01); *B65G 47/918* (2013.01)

(58) Field of Classification Search
CPC ........ B65G 47/32; B65G 47/69; B65G 47/90; B65G 47/901; B65G 47/902;
(Continued)

(56) References Cited

U.S. PATENT DOCUMENTS 4,456,115 A * 6/1984 McKnight ............... B07C 5/36
198/377.03
8,769,913 B2 * 7/2014 Monti ................. B65G 47/907
53/444
(Continued)

FOREIGN PATENT DOCUMENTS

CN 104843483 B 1/2017
JP H07157052 A 6/1995
(Continued)

OTHER PUBLICATIONS

Office Action, State Intellectual Property Office of China; corresponding CN application No. 201880062775.8; dated Jan. 28, 2022.

*Primary Examiner* — William R Harp
(74) *Attorney, Agent, or Firm* — Amarok IP Inc.; Neil W. Henderson

(57) ABSTRACT

A system for part transfer and transport, the system including: a first conveyor system for transporting a plurality of trays containing a two-dimensional grid of parts; a second conveyor system for transporting the parts to a predetermined destination in a linear arrangement; and a selection apparatus for transferring a linear array of parts selected from the grid of the first conveyor system to the linear arrangement of the second conveyor system, the selection apparatus comprising: a pick and place apparatus which may be cam driven for moving the parts; and a feed screw defining a plurality of singulated part spaces separated by a part pitch along the second conveyor to facilitate insertion of the linear array of parts into the linear arrangement.

11 Claims, 12 Drawing Sheets

Related U.S. Application Data

(60) Provisional application No. 62/553,499, filed on Sep. 1, 2017.

(58) Field of Classification Search
CPC .. B65G 47/904; B65G 47/905; B65G 47/907; B65G 47/908; B65G 47/91; B65G 47/911; B65G 47/912; B65G 47/914; B65G 47/915; B65G 47/917; B65G 47/918; B65G 35/066; B65G 33/02; B65G 65/00; B25J 15/0052; B65B 35/16; B65B 35/18
See application file for complete search history.

(56) References Cited

U.S. PATENT DOCUMENTS

| | | | |
|---|---|---|---|
| 2002/0197140 A1* | 12/2002 | Hiramoto | B65B 35/16 414/416.05 |
| 2004/0146383 A1 | 7/2004 | Behnke | |
| 2011/0259709 A1* | 10/2011 | Grossmann | B65G 33/04 198/339.1 |
| 2016/0176656 A1 | 6/2016 | Lang | |

FOREIGN PATENT DOCUMENTS

| | | | |
|---|---|---|---|
| JP | H08143145 A | * | 6/1996 |
| JP | H04104058 B | | 2/1997 |

* cited by examiner

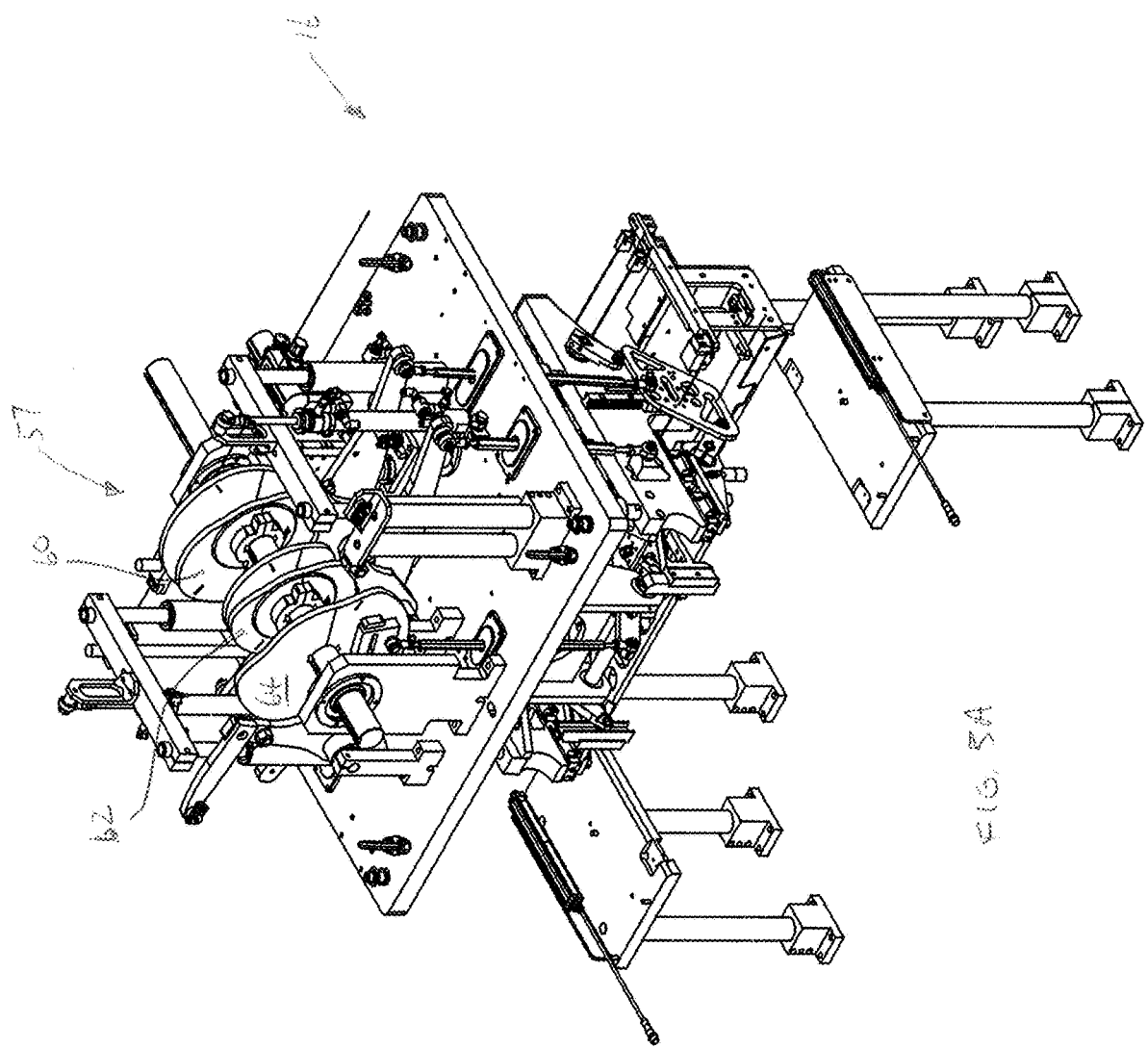

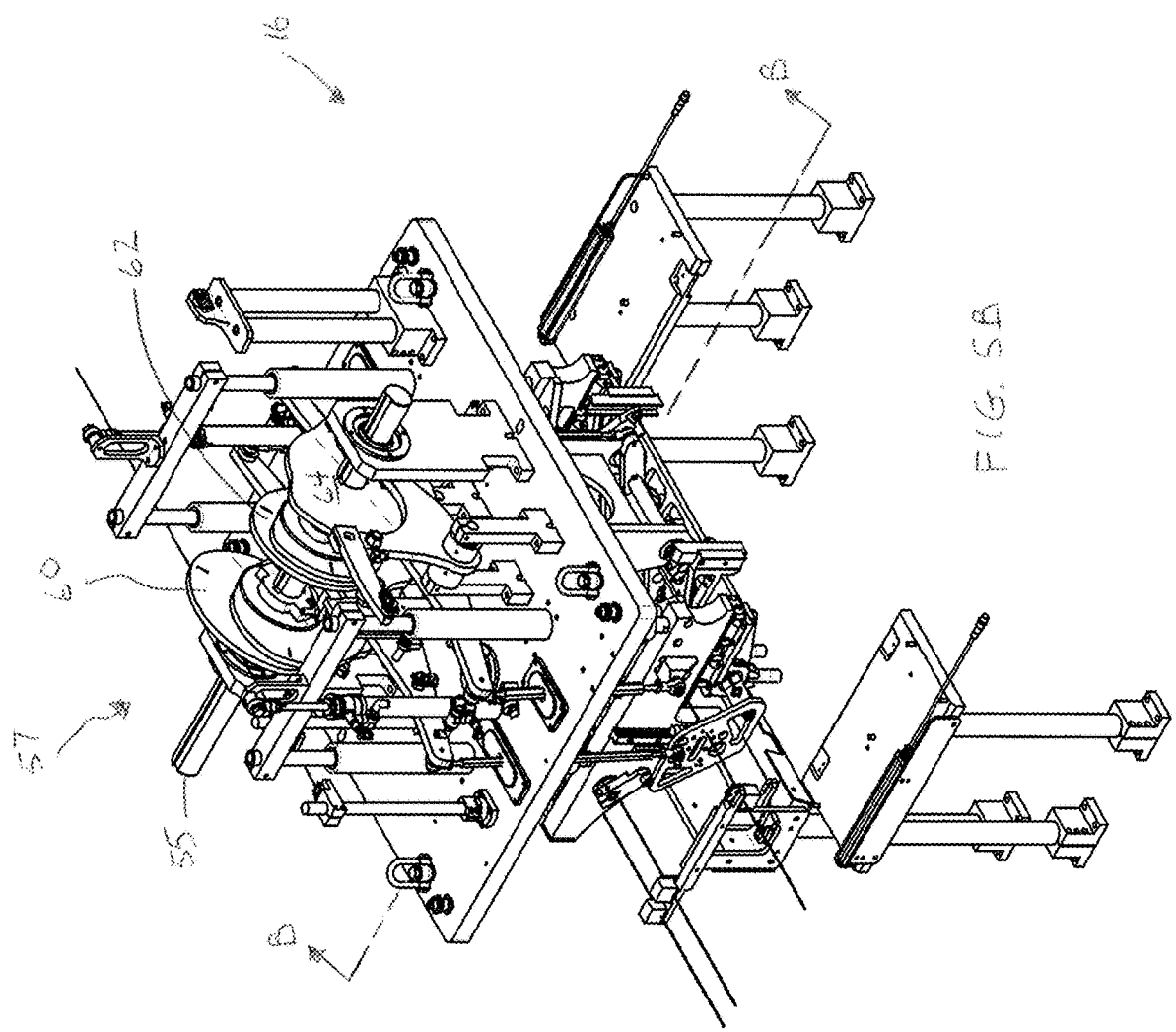

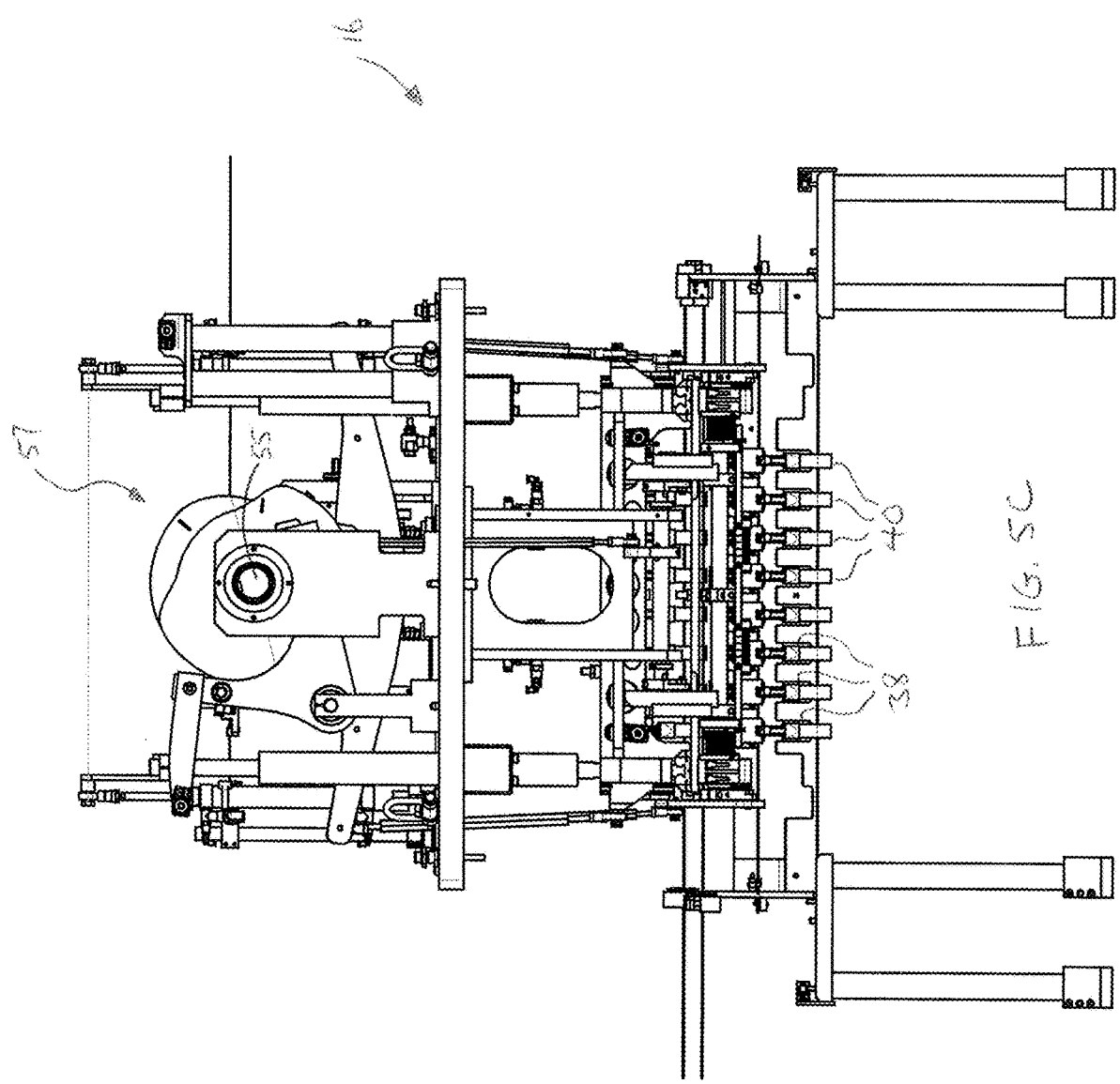

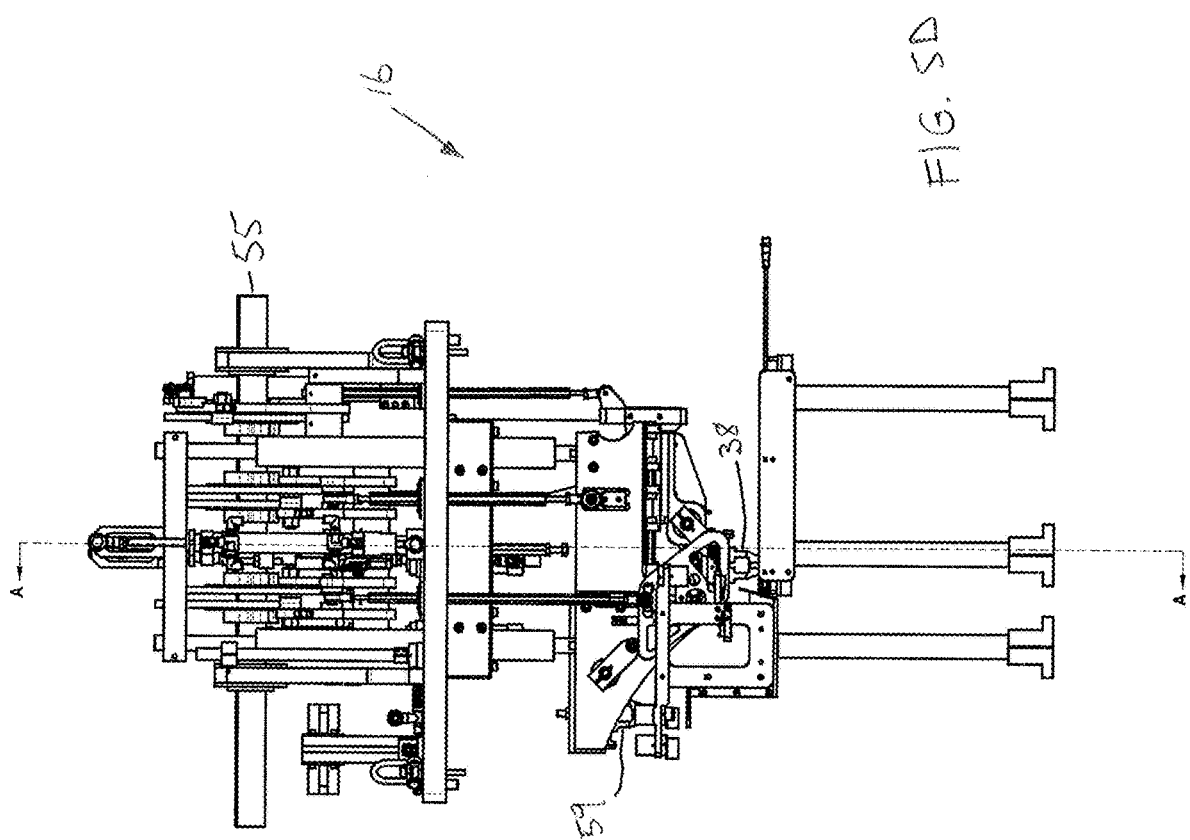

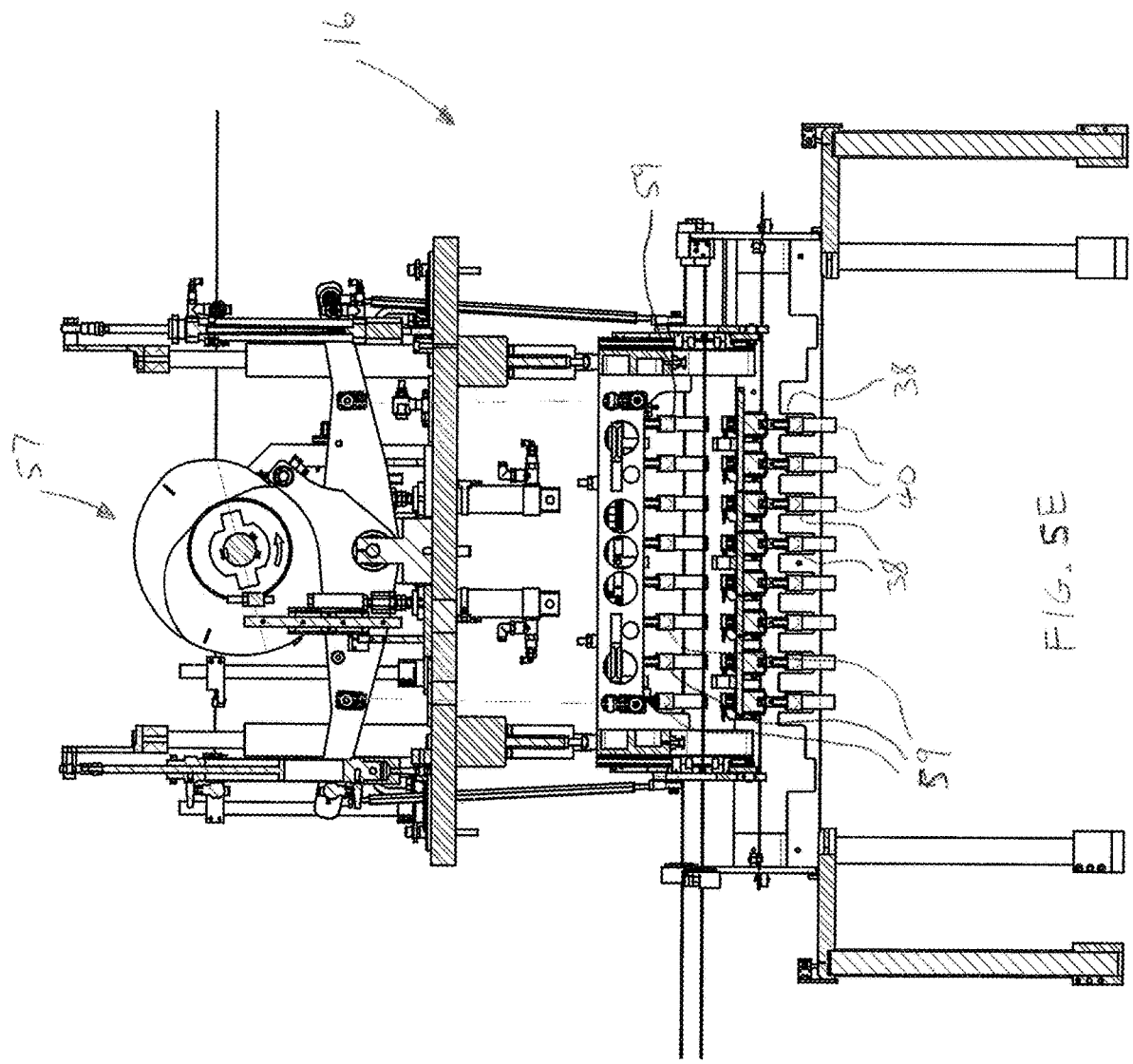

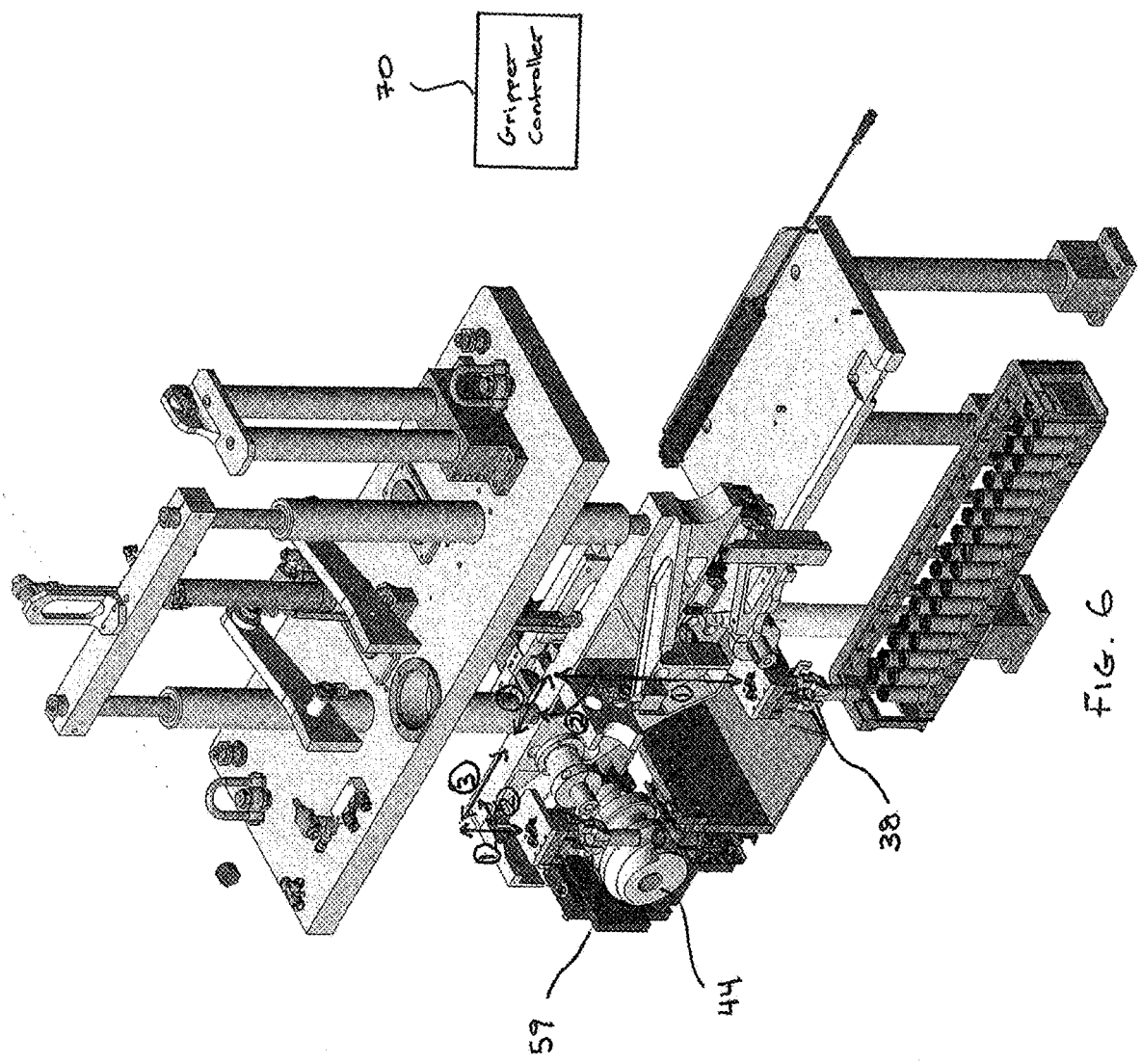

METHOD AND APPARATUS FOR PART TRANSFER AND TRANSPORT IN AN ASSEMBLY LINE

RELATED APPLICATIONS

This application is a continuation of PCT/CA2018/051043 filed Aug. 29, 2018, which claims priority to U.S. Provisional Patent Application No. 62/553,499 filed on Sep. 1, 2017, all of which are hereby incorporated herein by reference.

FIELD

This disclosure is directed generally at transporting parts in/on an assembly line, and more specifically at a method and apparatus for part transfer and transport when moving a group or matrix of parts on a first conveyor system to a second conveyor system in which the parts have a different configuration.

BACKGROUND

In part transfer and transport systems, parts are typically moved around by conveyors and then acted on at various stations along an assembly line. In some cases, a conveyor will feed a part or parts to a station, a process may be performed on the part or parts, and then a second conveyor will move the part or parts away from the station. In some cases, a group/matrix of parts may enter a station at which the parts can be rearranged to provide a different grouping of parts or single/individual parts for further processing. One of the difficulties in an assembly line operation is co-ordinating the movement of the conveyors together with the process of rearranging the parts or the process being performed at the station in an efficient, effective and repeatable way. This is particularly difficult in higher speed assembly processes where the co-ordination has to be done consistently over a very large number of high speed operations.

As such, there is an on-going need for an improved method and apparatus for part transfer and transport systems in assembly lines.

SUMMARY

According to one aspect herein, there is provided a system for part transfer and transport, the system including: a first conveyor system for transporting a plurality of trays containing a two-dimensional grid of parts; a second conveyor system for transporting the parts to a predetermined destination in a linear arrangement; and a selection apparatus for transferring a linear array of parts selected from the grid of the first conveyor system to the linear arrangement of the second conveyor system, the selection apparatus comprising: a pick and place apparatus for moving the parts; and a feed screw defining a plurality of singulated part spaces separated by a part pitch along the second conveyor to facilitate insertion of the linear array of parts into the linear arrangement.

In some cases, the second conveyor system may include a plurality of containers for carrying individual parts, and each singulated part space of the feed screw is sized to receive one of the containers.

In some cases, the system may include a servo for operating the feed screw.

In some cases, the pick and place apparatus may include: a first set of grippers for picking the linear array of parts from the tray along the first conveyor; and a second set of grippers for receiving the linear array of parts from the first set of grippers, and subsequently placing the linear array of parts into the singulated part spaces along the second conveyor.

In some cases, the system may include a cam assembly for operating the pick and place apparatus.

In some cases, the cam assembly may include: a vertical motion cam subassembly for raising and lowering the first and a second set of grippers; a rotational motion cam subassembly for rotating the first and second set of grippers; and a horizontal motion cam subassembly for moving the first and second set of grippers towards and away from each other to facilitate transfer of the linear array of parts between the first and second set of grippers.

In some cases, the first set of grippers provides the linear array of parts with a first rotation, and the second set of grippers may provide the linear array of parts with a second rotation to provide a full inversion of the parts.

In some cases, the system may further include a gripper controller for timing opening and closing of the first and second set of grippers in synchronization with the movement of the grippers.

In some cases, the system may further include a testing station for testing the parts and for tagging the parts as pass or fail for further handling.

In some cases, the second conveyor system includes a plurality of flexible chain conveyors.

In another aspect, there is provided a method for part transfer and transport, the method including: transporting a plurality of trays containing a two-dimensional grid of parts on a first conveyor system; operating a feed screw along a second conveyor to provide a linear arrangement of singulated part spaces separated by a part pitch; picking a linear array of parts from the grid, via a pick and place apparatus, and placing the parts into the singulated part spaces along the second conveyor system; and transporting the linear array of parts away from the pick and place apparatus via the second conveyor system.

In some cases, the second conveyor system may include a plurality of containers for carrying individual parts, and each singulated part space of the feed screw is sized to receive one of the containers In some cases, the feed screw may be operated by a servo.

In some cases, the picking of a linear array of parts may include: picking the linear array of parts from the tray along the first conveyor, via a first set of grippers; and receiving the linear array of parts from the first set of grippers, and subsequently placing the linear array of parts into the singulated part spaces along the second conveyor, via a second set of grippers.

In some cases, the pick and place apparatus may be operated by a cam assembly.

In some cases, the method may further include: rotating the part by a first rotation via the first set of grippers and; rotating the part a second rotation to provide a full inversion of the parts, via the second gripper.

In some cases, the method may further include testing the parts and for tagging the parts as pass or fail for further handling, via a testing station.

BRIEF DESCRIPTION OF FIGURES

Embodiments of the present disclosure will now be described, by way of example only, with reference to the attached Figures.

FIG. 5A is right side perspective view of an embodiment of a selection apparatus for use with the system of FIGS. 1 and 2;

FIG. 5B is a left side perspective view of the selection apparatus of FIG. 5A;

FIG. 5C is a front view of the selection apparatus of FIG. 5A;

FIG. 5D is a left side view of the selection apparatus of FIG. 5A;

FIG. 5E is a section view along the section line A-A in FIG. 5D;

FIG. 6 is a perspective cross-sectional view along the line B-B in FIG. 5B; and

DETAILED DESCRIPTION

The disclosure is directed at a method and system for transferring and transporting parts, preferably within an industrial or manufacturing environment. An embodiment of a part transport system of the present disclosure includes a first conveyor system and a second conveyor system. The first conveyor system may convey a grouping of parts, for example, parts carried in trays forming a two-dimensional grid, such as a matrix or the like. The second conveyor system may convey a different grouping of parts, in this example, individual parts, for example in a linear arrangement of singulated part spaces. The part transport system further includes a part selection apparatus, for example, a pick and place apparatus, for transferring a part from the first conveyor system to the second conveyor system. Further details on embodiments of the part selection apparatus are provided below. In this document, the term "part" is used, however, it will be understood that this may include a finished product, sub-assembly, or the like depending on the application.

Figure 1:
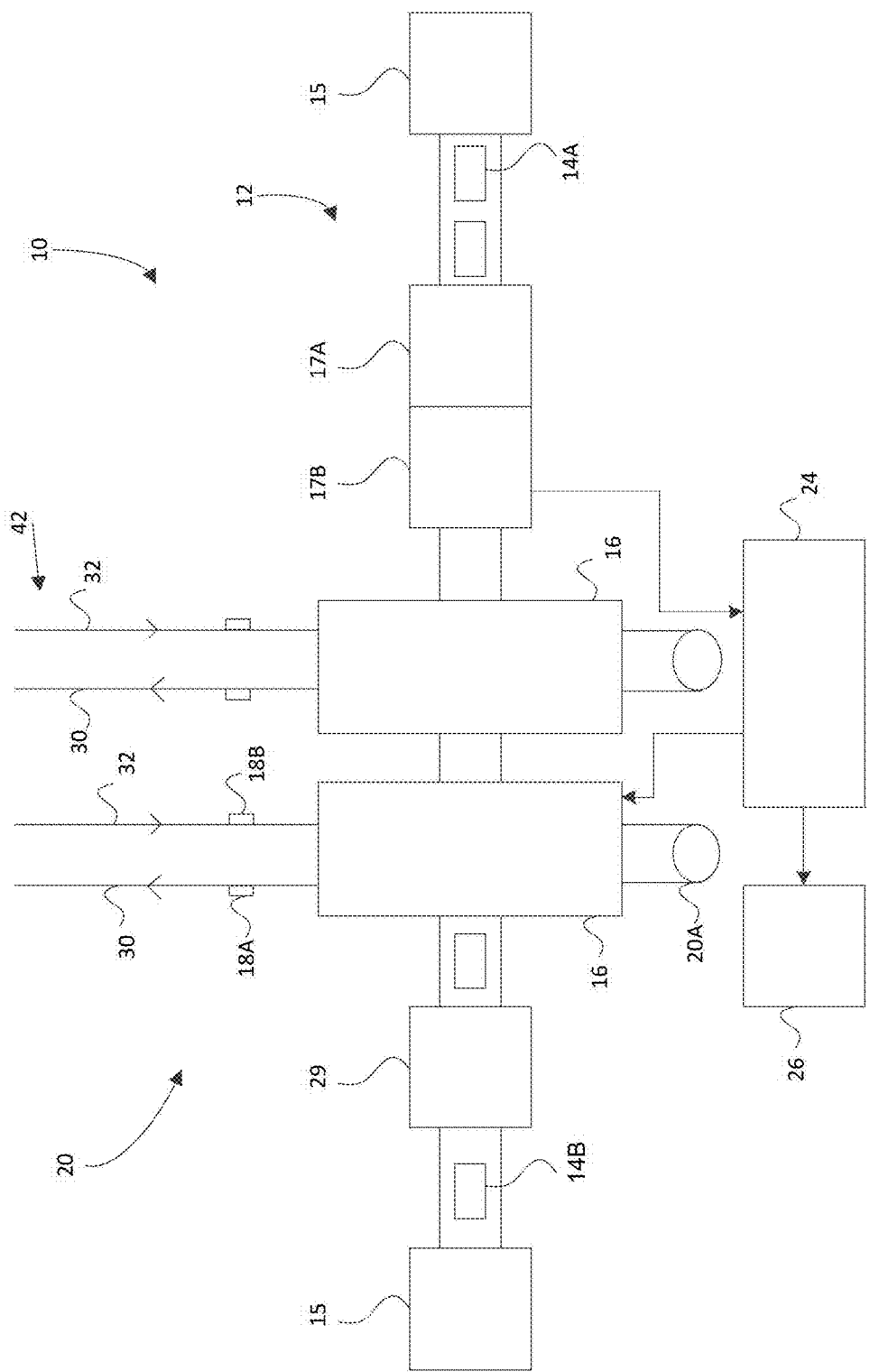
FIG. 1 is a schematic diagram of an embodiment of a part transport system.

Turning to FIG. 1, a schematic diagram of an embodiment of a system 10 or apparatus for transferring and transporting parts is shown. The part transport system 10 includes a first conveyance, or conveyor, system 12, for transporting trays 14 of a set of parts to a selection apparatus 16 (sometimes referred to as a pick and place apparatus 16). In some embodiments, the trays 14 may be delivered to the first conveyor system 12 using other or alternate forms of conveyor system, such as an automatic guided vehicle (AGV) 15.

It will be understood that in some embodiments, the trays, seen as full trays 14A, carry a matrix (rows and columns) of the same part, however, different products or parts may also be present within a single tray. In some embodiments, the first conveyor system 12 carries or delivers a plurality of trays 14A to the selection apparatus 16. In some embodiments, the trays 14A may be full or may be partially full. The trays may be considered to contain a two-dimensional grid or matrix of parts.

In some embodiments, the trays 14 may be placed on the first conveyor system 12 in a stacked manner. In this case, after receiving the stacked trays, the trays 14A may be unstacked at an optional unstacking station 17A. In some embodiments, to monitor part quality, the part transport system 10 or the first conveyor system 12 may include an optional part testing station 17B configured to performs tests on one or more parts in the tray 14A to determine if the part is suitable for further processing. In some cases, this may be a pass/fail determination. In some cases, if the part is marked as "fail", it will not be transferred to the second conveyor system 20. In other cases, if the part is marked as "fail", once placed on the second conveyor system 20 the part will be redirected to a secondary location for remediation, recycling or destruction. It will be understood that the unstacking station 17A and part testing station 17B are not necessarily required in embodiments as claimed.

The part transport system 10 or first conveyor system 12 may further include an indexing apparatus 24 for indexing the trays that are being received in order to track and correlate the parts when they are transferred to the second conveyor system 20, and, ultimately, the final destination. The indexing apparatus may include a barcode scanner (not shown), camera (not shown), near field reader (not shown) or the like that are positioned appropriately in relation to the first conveyor system 12 in order to track the parts. For example, in some embodiments, the indexing apparatus 24 scans barcodes associated with each of the parts, each of the trays 14, or the like and then stores this barcode and other information into a database 26, other storage medium or the like. The indexing apparatus 24 may also receive and provide control signals to the selection apparatus 16 and may include a processor for executing computer readable instructions on a computer readable medium for analysing and handling the control signals. The indexing apparatus 24 may also receive control signals from the part testing station station 17B with regard to the status of the parts (for example, "pass" or "fail") in the tray 14 for use in further processing.

One or more selection apparatuses 16 retrieve a group of parts, in this case, a linear array of parts, for example, a row of parts, from a full (or partially full) tray 14A as the tray 14A enters the area of the selection apparatus 16. As noted above, in some cases, the row may not be a complete row and there may be gaps between successive parts. The selection apparatus 16 then transfers each of the retrieved parts onto a second conveyor system 20. In some embodiments, the parts may be transferred into a linear arrangement of containers 18 that travel along the second conveyor system 20. In this example, the second conveyor system includes two flexible chain conveyors 42. Each flexible chain conveyor 42 includes an out path section 30 and a return path section 32 along which containers 18, either full (18A) or empty (18B), traverse. The containers 18 receive parts removed from the trays 14A by the selection apparatus 16. The containers 18 then move along the flexible chain conveyor 42 along the out path sections 30 to be delivered to a predetermined destination where the containers 18 can be emptied so the parts can undergo further processing. Empty containers 18B are then transported over the return path sections 32 for re-filling by the selection apparatus 16. In some embodiments, the tray and/or part information retrieved when the part is delivered to the selection apparatus 16 may be associated with each full container 18A carrying the transferred part in order to track the part through the process. Further details with respect to the selection apparatus 16 are provided below. It will be understood that the second conveyor system 20 may also be another type of conveyor system and may or may not require the containers to carry the parts. For example, the second conveyor system may be a linear motor conveyor system or the like. Further, the second conveyor system 20 is shown with containers arriving and departing on the same side of the first conveyor system 12 with a turnaround 20A to reverse the direction but this is not required and the second conveyor 20 may be arranged as a flow-through.

The first conveyor system 12 further includes a tray return section 28 where empty trays 14B or trays containing only "fail" parts, are fed from the selection apparatus 16 and may be further transported for refilling. In some cases, the trays 14B may be moved to an empty AGV 15, which then returns the empty trays to a predetermined destination, such as, but not limited to, a part filling station (not shown). In some embodiments, the empty trays may be stacked at the tray return station 28 or the like before being returned to the empty AGV 15.

Figure 2:
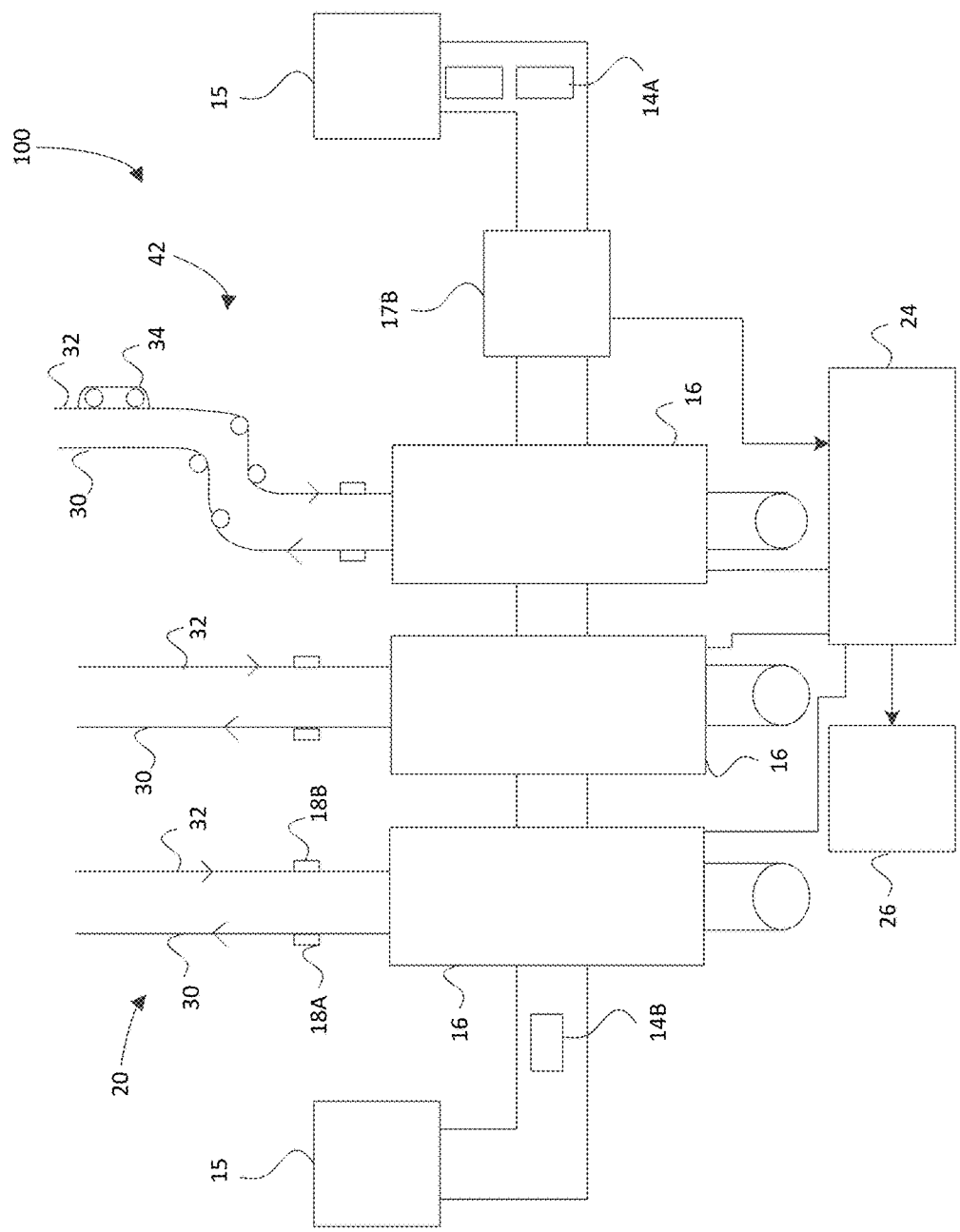
FIG. 2 is a schematic diagram of another embodiment of a part transport system.

Turning to FIG. 2, a schematic top view of another embodiment of a part transfer and transport system 100 is shown. It will be understood that this embodiment is intended to further illustrate the concepts herein and elements in this embodiment may be combined, interchanged or replaced with other embodiments as would be understood by one of skill in the art on reading this document. The part transport system 100 includes similar elements as the embodiment of FIG. 1 and similar numbering will be used accordingly. The part transport system 100 includes a first conveyor system 12 and a second conveyor system 20 as well as one or more part selection apparatuses 16 (in this case, three) for transferring parts from the first to second conveyor systems. The transport system 100 may also include the indexing apparatus 24 and the database 26. Within the second conveyor system 20, the flexible chain conveyors 42 may include one or more buffers 34 on the out path sections 30 and/or the return path sections 32. The buffers 34 allow for better control of the movement of the containers/parts along the second conveyor system 20 by allowing for storage/delay of movement of selected containers/parts.

Figure 3B:
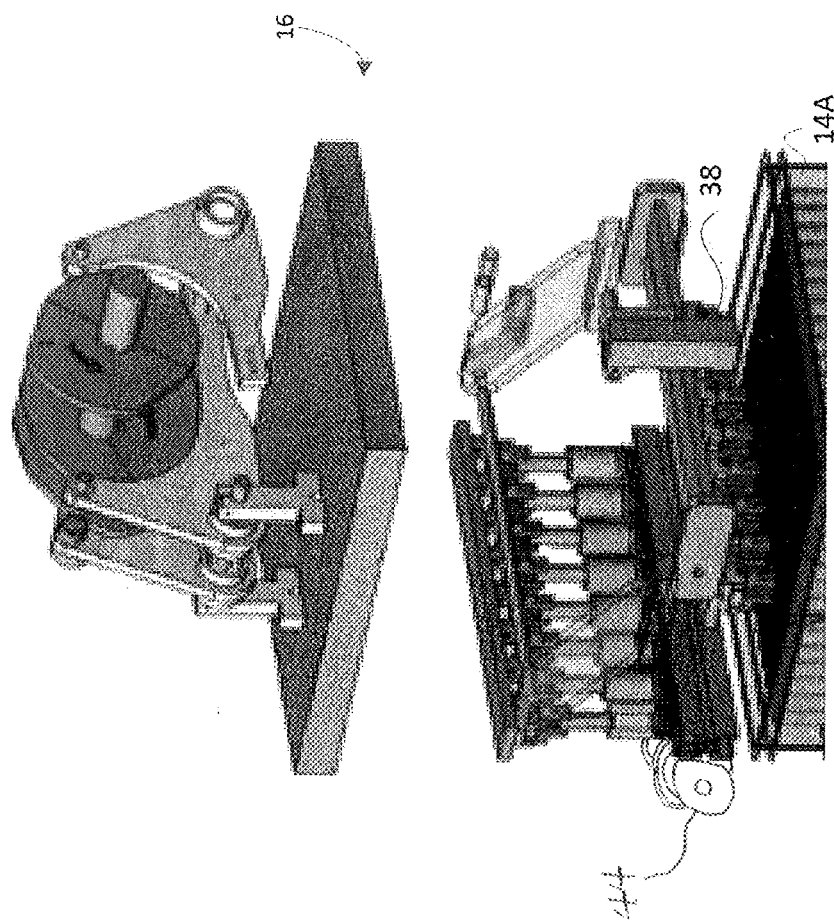
FIG. 3B is an exploded perspective view of an embodiment of a selection apparatus.
Figure 3A:
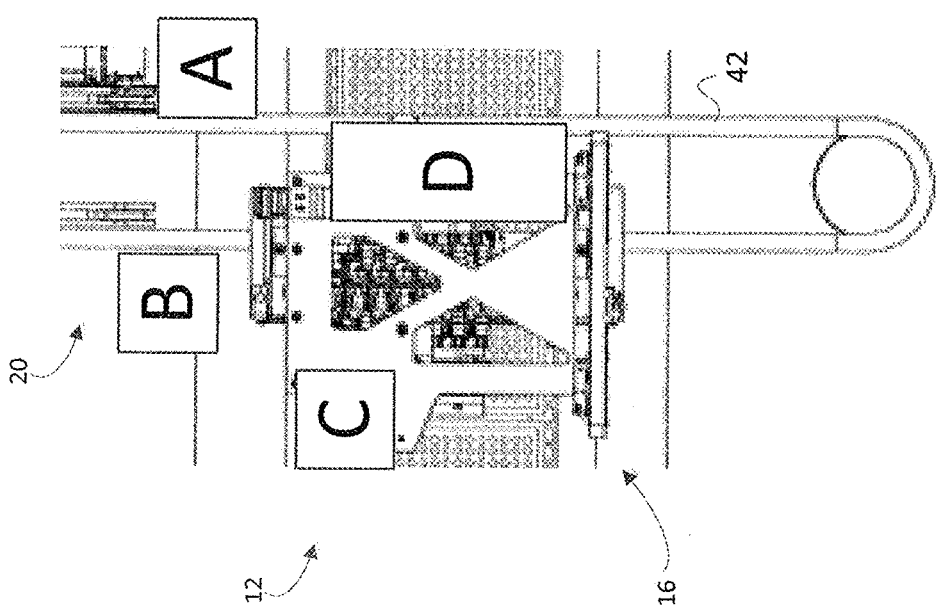
FIG. 3A is a partial view of a selection apparatus portion of the part transport system of FIGS. 1 and 2.

Turning to FIG. 3A, an enlarged schematic view of the selection apparatus 16 of FIG. 1 is shown. FIG. 3A provides a general indication of where different actions performed by the selection apparatus 16 occur. Area A reflects the return path 32 where the empty containers 18B are returned for filling by the selection apparatus 16. Area B reflects the out path 30 where a full container 18A is transferred from the selection apparatus 16 to a predetermined location where the container can be unloaded or emptied. Area C reflects the area where the selection apparatus 16 picks up a grouping of parts (e.g. a row) from one of the trays 14A and then transfers this grouping of parts to the second conveyor 20. Area D reflects an area where a feed screw 44 (shown in FIGS. 3B and 6) receives incoming empty containers 18B and adjusts the positioning of the empty containers (such as by adjusting the pitch) so that one or more containers 18B are ready for receiving the grouping of parts from the selection apparatus 16. In this embodiment, the feed screw 44 may define a plurality of singulated part spaces separated by a part pitch along the second conveyor 20. In some cases, the second conveyor 20 includes a plurality of containers 18 for carrying individual parts and each singulated part space of the feed screw 44 is sized to receive one of the containers.

In some embodiments, the feed screw 44 manipulates the pitch of the empty containers 18B to match the pitch of the parts being held by the grippers so that the parts can be inserted into the empty containers 18B.

In use, the feed screw 44, or timing feed screw, can provide an added benefit to the system as it is able to control and adapt the movement of the empty containers 18B along the return path 32 to the requirements of the selection apparatus 16. In other words, the positioning of the empty containers 18B within the second conveyor system 20 can be controlled with respect to the selection apparatus 16 in order to facilitate the placement of the part within the empty container 18B. The timing feed screw 44 may provide a degree of precision and reliability for positioning the empty containers, which can be beneficial in a high-speed manufacturing environment. For example, pitching by the feed screw 44 can help to more easily place the parts in containers after the parts have been manipulated by the pick and place apparatus. Along with the positioning, the timing feed screw 44 may also assist to control the timing in which the empty containers 18B pass by the selection apparatus 16. In some cases, the second conveyor system 20 can also provide driving force, drive pressure or the like to the timing feed screw 44 to assist in its operation.

FIG. 3B is an exploded perspective view of an embodiment of the selection apparatus 16, in this case, a pick and place apparatus for transferring the grouping of parts from the tray 14A to the containers 18B. As can be seen, the pick and place apparatus includes a set of grippers 38 that grip and hold the grouping of parts (retrieved from the tray 14A). Further details of the transfer of the part 40 will be described below.

Figure 4:
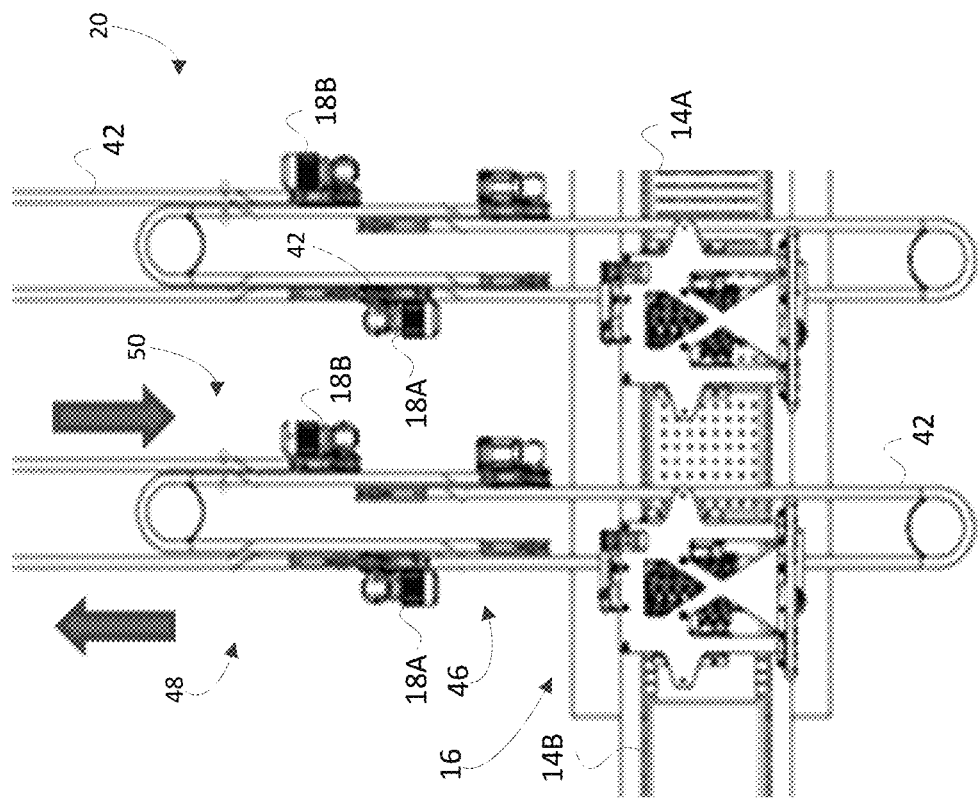
FIG. 4 is detail view of an embodiment of a second conveyor system.

Turning to FIG. 4, a schematic diagram showing additional detail for an embodiment of the second conveyor system 20 is shown. In this embodiment, the flexible chain conveyors 42 of the second conveyor system 20 pass through the selection apparatus 16 where an empty container 18B is filled with a part by the selection apparatus 16. In general, the second conveyor system 20 transports parts from the selection apparatus to downstream equipment, at a predetermined destination, for processing or emptying of the containers. In some cases, the container may be empty or hold a "fail" part (due to the rejection of a part or the like) when leaving the selection apparatus 16. In this case, the system 10 may also include a container separation area 46, a void separation station 48, and/or a container merge section 50. At the container separation area 46, the containers 18 may be diverted to a parallel and/or adjacent conveyor in order to introduce gaps between containers and/or to disengage the nesting of containers with each other. In this case, the parallel and/or adjacent conveyor may be operating at a faster speed. At the void separation section or station 48, the apparatus determines if the container leaving the selection apparatus 16 is full or empty. If it is full, the container 18A continues along the out path 30 towards the predetermined destination. If the container is empty, the empty container 18B can be diverted back to the selection apparatus 16 via the return path 32 and merge with other empty containers at the merge section 50. There may also be an alternate path for "fail" parts that are being sent for further processing or the like.

Figure 5F:
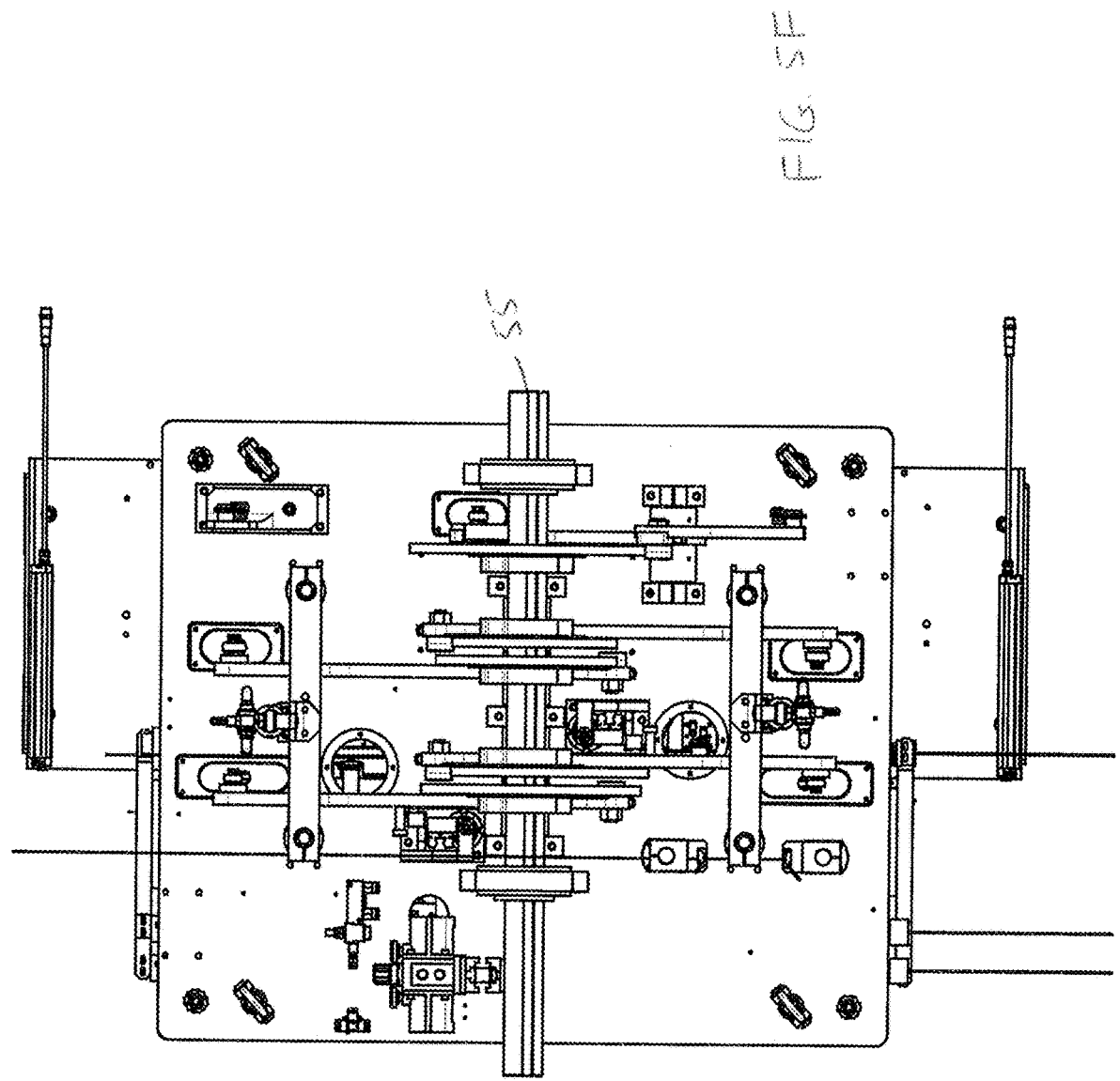
FIG. 5F is a top view of the selection apparatus of FIG. 5A.

FIG. 5A to 5F are views of an embodiment of the selection apparatus 16. FIGS. 5A and 5B are right and left side perspective views, FIG. 5C is a front view, FIG. 5D is a left side view, FIG. 5E is a section view along the section line A-A in FIG. 5D, and FIG. 5F is a top view. The selection apparatus 16 is driven by a drive shaft 55, which rotates a cam assembly 57. The cam assembly 57 is used for high-speed, consistently repeatable actions over long periods of time and operations with less chance of wear than servo-based systems. A tray 14A enters the front of the selection apparatus 16, where the grippers 38 grip a group of parts 40 (in this case, a linear array of parts) and, in this embodiment, rotate the parts 90 degrees, where they are transferred to second grippers 59, which then deposit the parts into containers 18B which are brought into alignment with the second grippers 59 by the second conveyor system 20. The containers 18B are in a linear arrangement to match with the grippers 38.

The grippers 38 and 59 may also move up-and-down, and from side-to-side during operation. For example, with reference to FIG. 6, the grippers 38 and 59 may rise during a first phase (identified by numeral 1), rotate inward towards each other during a second phase (identified by numeral 2), and move sideways towards each other during a third phase (identified by numeral 3). Accordingly, with reference to FIG. 5B, the cam assembly 57 may include a vertical motion cam subassembly 60 for raising and lowering the grippers 38 and 59, a rotational motion cam subassembly 62 for rotating the grippers 38 and 59, and a horizontal motion cam subassembly 64 for moving the first and second set of grippers towards and away from each other. The cam subassemblies 60, 62, 64 are configured with cam profiles that synchronize operation of the grippers 38 and 59 to facilitate transfer of the array of parts from the first conveyor system 12 to the second conveyor system 20.

As shown in this embodiment, the cam subassemblies 60 and 62 may include pairs of cam plates for driving corresponding linkage pairs. As shown, the pairs of cam plates may have different cam profiles based on their corresponding linkage configurations. Even though the cam profiles are different, the pairs of cam plates may cooperate with the linkages to provide mirrored motion, which can help provide operational stability when moving the grippers 38 and 59.

In some embodiments, there may be a gripper controller 70 (shown schematically) for timing opening and closing of the grippers in synchronization with the cam assembly 57. For example, the gripper controller 70 may be a PLC for pneumatically controlling the grippers 38 and 59. Accordingly, the gripper controller 70 may actuate valves for controlling pneumatic pressure. In other embodiments, the grippers 38 and 59 may be controlled using other mechanisms, such as servos, cam drivers, and the like.

In some embodiments, motion of the grippers 38 and 59 may be controlled to have matching movements for the vertical, rotational, and/or horizontal motion phases (identified by numerals 1, 2, and 3 in FIG. 6).

Figure 7:
FIG. 7 is a flowchart outlining a method of part transfer and transport.

FIG. 7 shows a flowchart of an embodiment of a method of part transfer and transport 1000. Initially, at least one tray of parts is received. The parts are arranged within the tray, typically in a grid format. In some embodiments, there may be more than one tray and the trays may arrive stacked whereby the trays are then unstacked by the system before the method commences.

The at least one tray travels along a first conveyor system and, optionally, an identification code associated with the single tray or with the parts therein is scanned (1005). The identification code may be scanned while the tray is moving or at a scanning station. The identification code may also include information associated with the parts within the tray such as, but not limited to, production date, part code, part size and the like. The identification code can then be stored in a database 26 or on a storage medium for later retrieval by the system (1010).

In some embodiments, the method may optionally include a test performed on the parts to determine if the parts conform to expected characteristics. For example, a test may be performed to confirm that a size of a part does not exceed expected dimensions. If there are non-conforming parts, they can then be removed or may not be picked up by the selection apparatus/pick and place apparatus and left in the tray based on control signals from a processor that is controlling the operation of the system.

In some embodiments, the trays are moved into alignment with the pick and place apparatus by a servo walking beam to place the tray in a proper position for the retrieval of products from the tray.

As the tray is brought into alignment with the pick and place apparatus, empty containers for transporting individual parts are received by the pick and place apparatus via a second conveyor system. Identification information associated with each of the containers, for example, from a barcode, a near field tag (for example, a radio frequency identification (RFID) tag) or the like on the container, may be scanned and then saved within the database (1020). As will be understood, this may be performed in parallel with respect to the scanning of the tray code and the storage of the tray code.

In some embodiments, the feed screw 44 can be used to align a plurality of containers with the pick and place apparatus such that the pitch of the containers is adjusted to a preferred pitch for receiving the parts (1020). The feed screw 44 may be servo controlled, cam driven, a cam drive, and/or may be driven by the second conveyor system.

The pick and place apparatus then retrieves an array, matrix or group of parts from the grid, for example, a row of parts (1030). The row of parts can then be manipulated by the pick and place apparatus (1040) as needed to orient the row of parts for placement into the containers. In some embodiments, the row of parts can be picked from the tray and then rotated 90 degrees before being passed to a second pick apparatus which rotates the row of parts a further 90 degrees before placing them into the containers.

Once oriented, the parts are inserted into the individual containers, for example in a linear arrangement, and each container is associated with a part (1050) such as by matching, or assigning, the container ID information (from, for example, the RFID tag or the like) with the identification code obtained from the tray. This combined information may then be stored in the database and/or transmitted to another processing unit. The filled containers are then transported on the second conveyor system for delivery to a designation location (1060). The process is then repeated with another row of parts and empty containers until the tray is emptied (1070).

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

We claim:

1. A system for part transfer and transport, the system comprising:
   a first conveyor system for transporting a plurality of trays containing a two-dimensional grid of parts;
   a second conveyor system for transporting the parts to a predetermined destination in a linear arrangement, wherein the second conveyor system comprises a plurality of containers for carrying individual parts; and
   a selection apparatus for transferring a linear array of parts selected from the grid of the first conveyor system to the linear arrangement of the second conveyor system, the selection apparatus comprising:
      a pick and place apparatus for moving the parts, wherein the pick and place apparatus comprises:
         a first set of grippers for picking the linear array of parts from the tray along the first conveyor; and
         a second set of grippers for receiving the linear array of parts from the first set of grippers, and subsequently placing the linear array of parts into the plurality of containers for carrying individual parts along the second conveyor; and
      a feed screw defining a plurality of singulated part spaces separated by a part pitch along the second conveyor to facilitate insertion of the linear array of parts into the linear arrangement,
   wherein each singulated part space of the feed screw is sized to receive one of the plurality of containers of the second conveyor.

2. A system according to claim 1 further comprising a servo for operating the feed screw.

3. A system according to claim 1 further comprising a cam assembly for operating the pick and place apparatus.

4. A system according to claim 3 wherein the cam assembly comprises:
   a vertical motion cam subassembly for raising and lowering the first and a second set of grippers;
   a rotational motion cam subassembly for rotating the first and second set of grippers; and
   a horizontal motion cam subassembly for moving the first and second set of grippers towards and away from each other to facilitate transfer of the linear array of parts between the first and second set of grippers.

5. A system according to claim 1 wherein the first set of grippers provides the linear array of parts with a first rotation, and the second set of grippers may provide the linear array of parts with a second rotation to provide a full inversion of the parts.

6. A system according to claim 1 further comprising a gripper controller for timing opening and closing of the first and second set of grippers in synchronization with the movement of the grippers.

7. A system according to claim 1 further comprising a testing station for testing the parts and for tagging the parts as pass or fail for further handling.

8. A system according to claim 1 wherein the second conveyor system includes a plurality of flexible chain conveyors.

9. A method for part transfer and transport, the method comprising:
   transporting a plurality of trays containing a two-dimensional grid of parts on a first conveyor system;
   operating a feed screw along a second conveyor to provide a linear arrangement of singulated part spaces separated by a part pitch, wherein the second conveyor system comprises a plurality of containers for carrying individual parts, and each singulated part space of the feed screw is sized to receive one of the containers;
   picking a linear array of parts from the grid, via a pick and place apparatus, and placing the parts into the singulated part spaces along the second conveyor system, wherein the picking of a linear array of parts comprises:
      picking the linear array of parts from the tray along the first conveyor, via a first set of grippers: and
      receiving the linear array of parts from the first set of grippers, and subsequently placing the linear array of parts into the sinqulated part spaces along the second conveyor, via a second set of grippers; and
   transporting the linear array of parts away from the pick and place apparatus via the second conveyor system.

10. A method according to claim 9, further comprising:
   rotating the part by a first rotation via the first set of grippers; and
   rotating the part a second rotation to provide a full inversion of the parts, via the second gripper.

11. A method according to claim 9, further comprising testing and tracking the status of parts for further handling, via a testing station.

* * * * *